United States Patent
Kimura et al.

(10) Patent No.: US 8,299,138 B2
(45) Date of Patent: Oct. 30, 2012

(54) PROCESS FOR PRODUCING FLEXIBLE POLYURETHANE FOAM

(75) Inventors: Yuuji Kimura, Kamisu (JP); Takayuki Sasaki, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/749,994

(22) Filed: May 17, 2007

(65) Prior Publication Data

US 2007/0213420 A1 Sep. 13, 2007

Related U.S. Application Data

(63) Continuation of application No. PCT/JP2005/021148, filed on Nov. 17, 2005.

(30) Foreign Application Priority Data

Nov. 18, 2004 (JP) ................................. 2004-334543

(51) Int. Cl.
C08G 18/28 (2006.01)

(52) U.S. Cl. ........ 521/174; 521/130; 521/131; 521/133; 521/137

(58) Field of Classification Search .................. 521/130, 521/131, 133, 137, 174
See application file for complete search history.

(56) References Cited

U.S. PATENT DOCUMENTS

| | | | | |
|---|---|---|---|---|
| 4,877,906 A | * | 10/1989 | Harper | 568/621 |
| 5,093,380 A | | 3/1992 | Takeyasu et al. | |
| 5,605,939 A | | 2/1997 | Hager | |
| 5,648,559 A | | 7/1997 | Hager | |
| 5,952,457 A | * | 9/1999 | Kouno et al. | 528/408 |
| 6,063,825 A | | 5/2000 | Isobe et al. | |
| 6,207,794 B1 | * | 3/2001 | Yamasaki et al. | 528/408 |
| 6,653,362 B2 | | 11/2003 | Toyota et al. | |
| 6,734,219 B2 | | 5/2004 | Wada et al. | |
| 6,756,415 B2 | | 6/2004 | Kimura et al. | |
| 6,815,467 B2 | * | 11/2004 | Toyota et al. | 521/174 |
| 6,831,112 B2 | * | 12/2004 | Kaku et al. | 521/174 |
| 6,906,110 B1 | | 6/2005 | Lorenz et al. | |
| 2001/0023263 A1 | | 9/2001 | Bruchmann et al. | |
| 2003/0045595 A1 | * | 3/2003 | Toyota et al. | 521/155 |
| 2003/0114550 A1 | | 6/2003 | Toyota et al. | |
| 2003/0158281 A1 | | 8/2003 | Parfondry et al. | |
| 2004/0152797 A1 | | 8/2004 | Wada et al. | |
| 2004/0229970 A1 | | 11/2004 | Sasaki et al. | |
| 2006/0160912 A1 | | 7/2006 | Sasaki et al. | |
| 2006/0160913 A1 | | 7/2006 | Sasaki et al. | |

FOREIGN PATENT DOCUMENTS

| | | | |
|---|---|---|---|
| EP | 1277775 | * | 7/2002 |
| EP | 1 283 231 A1 | | 2/2003 |
| JP | 3-14812 | | 1/1991 |
| JP | 8-311149 | | 11/1996 |
| JP | 2615927 | | 3/1997 |
| JP | 9-176272 | | 7/1997 |
| JP | 11-140154 | | 5/1999 |
| JP | 2000-26566 | | 1/2000 |
| JP | 2000-281745 | | 10/2000 |
| JP | 2000-517347 | | 12/2000 |
| JP | 2001-226448 | | 8/2001 |
| JP | 2002-542353 | | 12/2002 |
| JP | 2004-504425 | | 2/2004 |
| JP | 2005/301000 | | 10/2005 |
| WO | WO 2004/014980 | * | 2/2004 |

OTHER PUBLICATIONS

U.S. Appl. No. 11/876,237, filed Oct. 22, 2007, Sasaki, et al.
U.S. Appl. No. 11/944,002, filed Nov. 21, 2007, Sasaki, et al.
U.S. Appl. No. 11/944,730, filed Nov. 26, 2007, Sasaki, et al.
U.S. Appl. No. 11/944,665, filed Nov. 26, 2007, Sasaki, et al.
U.S. Appl. No. 11/944,799, filed Nov. 26, 2007, Sasaki, et al.
U.S. Appl. No. 11/752,600, filed May 23, 2007, Sasaki, et al.
U.S. Appl. No. 12/429,762, filed Apr. 24, 2009, Sasaki, et al.
U.S. Appl. No. 12/412,416, filed Mar. 27, 2009, Sasaki, et al.
U.S. Appl. No. 12/200,145, filed Aug. 28, 2008, Sasaki, et al.
U.S. Appl. No. 12/210,509, filed Sep. 15, 2008, Sasaki, et al.
U.S. Appl. No. 12/719,930, filed Mar. 9, 2010, Sasaki, et al.
U.S. Appl. No. 12/732,778, filed Mar. 26, 2010, Sasaki, et al.
Extended European Search Report issued Mar. 16, 2011, in European Application No. 05806646.5.
Korean Office Action issued Mar. 16, 2012, in Korea Patent Application No. 2007-7010315 (with English translation).

* cited by examiner

*Primary Examiner* — John Cooney
(74) *Attorney, Agent, or Firm* — Oblon, Spivak, McClelland, Maier & Neustadt, L.L.P.

(57) ABSTRACT

A process for producing a flexible polyurethane foam having a low transmissibility at resonance frequency, of which a rebound resilience can be suppressed, without using a foam stabilizer, is provided.

In production of a flexible polyurethane foam; an isocyanate containing TDI as the main component is used as an isocyanate; and a polyol containing from 20 to 50 mass % of a polyol (A) having an oxyethylene group content of from 10 to 20 mass % and having a hydroxyl value of from 15 to 56 mgKOH/g, which is obtained by subjecting propylene oxide to ring opening addition polymerization to an initiator by using a double metal cyanide complex catalyst, and further subjecting ethylene oxide to ring opening addition polymerization by using an alkali metal compound catalyst or a phosphazenium catalyst, is used as a polyol.

18 Claims, No Drawings

PROCESS FOR PRODUCING FLEXIBLE POLYURETHANE FOAM

TECHNICAL FIELD

The present invention relates to a process for producing a flexible polyurethane foam using no silicone foam stabilizer.

BACKGROUND ART

A flexible polyurethane foam is employed as e.g. a seat cushion for automobiles. In recent years, fogging that takes place on the surface of glass of automobiles, which is caused by a volatile organic compound (VOC) released from a flexible polyurethane foam, has been a problem, and reduction of the amount of a catalyst or a volatile organic compound such as a silicone compound, used for production of the flexible polyurethane foam, is desired.

With regard to the reduction of the catalyst, a method of producing a flexible polyurethane foam without using a catalyst (Patent Document 1), a method of using a reactive amine catalyst in which its structure is partially hydroxylated or aminated so as to react with an isocyanate, is, for example, known.

On the other hand, in the production of a flexible polyurethane foam, a foam stabilizer is usually used, and a silicone foam stabilizer is mainly used as the foam stabilizer. However, a reduction of a silicone foam stabilizer from a flexible polyurethane foam has hardly been tried so far.

As a polyurethane foam produced without using a foam stabilizer, an integral skin foam, a semirigid foam or the like is known. However, these polyurethane foams are employed for interior materials for automobiles other than seat cushions, and have different texture from the flexible polyurethane foam.

Further, it is known that by using, as an isocyanate compound, an isocyanate compound containing diphenylmethane diisocyanate (MDI) or polymethylene polyphenyl isocyanate (polymeric MDI) as the main component, a polyurethane foam can be produced without using a foam stabilizer. However, in a case where an isocyanate compound containing tolylene diisocyanate (TDI) as the main component, which is mainly used as a starting material of a flexible polyurethane foam, was used, the production of a flexible polyurethane foam itself was difficult without using a foam stabilizer.

On the other hand, a method of producing a flexible polyurethane foam by using a foam stabilizer and by using a polyoxyalkylene polyol produced by using a double metal cyanide complex catalyst is known (Patent Document 2).
Patent Document 1: JP-A-08-311149
Patent Document 2: JP-A-03-14812

DISCLOSURE OF THE INVENTION

Object to be Accomplished by the Invention

The object of the present invention is to provide a process for producing a flexible polyurethane foam having a low transmissibility at resonance frequency, of which a rebound resilience can be suppressed without using a silicone foam stabilizer.

Means to Accomplish the Object

The process for producing a flexible polyurethane foam of the present invention is a process for producing a flexible polyurethane foam, which comprises reacting an isocyanate compound and a high molecular weight polyol compound in the presence of a urethane-forming catalyst and a blowing agent, wherein as the isocyanate compound, an isocyanate compound containing from 50 to 100 mass % of tolylene diisocyanate in the isocyanate compound (100 mass %) is used, as the high molecular weight polyol compound, a high molecular weight polyol compound containing from 20 to 65 mass % of the following polyoxypropylene-polyoxyethylene polyol (A) in the high molecular weight polyol compound (100 mass %) is used, and substantially no silicone foam stabilizer is used.

(Polyoxypropylene-polyoxyethylene polyol (A)): a polyoxypropylene-polyoxyethylene polyol (A) having an oxyethylene group only at its terminal, which is obtained by subjecting propylene oxide to ring opening addition polymerization to an initiator by using a double metal cyanide complex catalyst, and further subjecting ethylene oxide to ring opening addition polymerization by using an alkali metal compound catalyst or a phosphazenium catalyst, wherein the content of the oxyethylene group at the terminal is from 10 to 20 mass % in the polyoxypropylene-polyoxyethylene polyol (A) (100 mass %), and the hydroxyl value is from 15 to 56 mgKOH/g.

Further, the process for producing a flexible polyurethane foam of the present invention is a process for producing a flexible polyurethane foam, which comprises reacting an isocyanate compound and a high molecular weight polyol compound in the presence of a urethane-forming catalyst and a blowing agent, wherein as the isocyanate compound, an isocyanate compound containing from 50 to 100 mass % of tolylene diisocyanate in the isocyanate compound (100 mass %) is used, as the high molecular weight polyol compound, a high molecular weight polyol compound containing from 20 to 65 mass % of the following polyoxypropylene-polyoxyethylene polyol (A) in the high molecular weight polyol compound (100 mass %) is used, and the flexible polyurethane foam to be produced contains substantially no atoms other than carbon atoms, hydrogen atoms, nitrogen atoms and oxygen atoms.

The high molecular weight polyol compound is preferably a high molecular weight polyol compound containing fine polymer particles dispersed in the high molecular weight polyol compound.

Further, it is particularly preferred to use from 0.01 to 10 parts by mass of a polyol (C) which is a polyoxyalkylene-oxyethylene polyol having an oxyethylene group content of from 50 to 100 mass % and a hydroxyl value of from 15 to 56 mgKOH/g, in the high molecular weight polyol compound (100 mass %).

Effects of the Invention

According to the process for producing a flexible polyurethane foam of the present invention, a flexible polyurethane foam having a low transmissibility at resonance frequency, of which a rebound resilience can be suppressed without using a silicone foam stabilizer, can be obtained.

BEST MODE FOR CARRYING OUT THE INVENTION

In the process for producing a flexible polyurethane foam (hereinafter sometimes referred to as flexible foam) of the present invention, an isocyanate compound and a high molecular weight polyol compound are reacted in the presence of a urethane-forming catalyst and a blowing agent.

The details of each component will be described.

<High Molecular Weight Polyol Compound>

In the present invention, a high molecular weight polyol compound is used. The high molecular weight polyol compound is preferably a polyoxyalkylene polyol having a hydroxyl value of from 15 to 56 mgKOH/g or a mixture thereof. This high molecular weight polyol compound contains a polyol (A) described hereinafter as an essential component, and may contain a polyol (B) and/or a polyol (C) in addition.

(Polyol (A))

The high molecular weight polyol compound of the present invention contains a polyoxypropylene-polyoxyethylene polyol (A) (hereinafter referred to as polyol (A)), which is obtained by subjecting propylene oxide to ring opening addition polymerization to an initiator by using a double metal cyanide complex catalyst, and further subjecting ethylene oxide to ring opening addition polymerization by using an alkali metal compound catalyst or a phosphazenium catalyst.

As the double metal cyanide complex catalyst, one disclosed in JP-B-46-27250 may be mentioned. As the double metal cyanide complex catalyst, a complex containing zinc hexacyanocobaltate as the main component is preferred, and a complex having an ether and/or an alcohol coordinated, is particularly preferred in view of its high activity. The ether as a ligand may, for example, be ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME). The alcohol as a ligand may, for example, be tert-butyl alcohol.

Particularly, ethylene glycol mono-tert-butyl ether (METE) is preferred as the ligand.

As a polymerization catalyst at the time of subjecting ethylene oxide to ring opening addition polymerization, an alkali metal compound catalyst such as a potassium compound (potassium hydroxide, potassium methoxide or the like) or a cesium compound (cesium metal, cesium hydroxide, cesium carbonate, cesium methoxide or the like), or a phosphazenium compound, may is be mentioned, and among them, an alkali metal compound catalyst is preferred, and a potassium compound is particularly preferred.

As an initiator, a compound having 2 to 6 active hydrogen atoms in its molecule is preferred. For example, a polyhydric alcohol such as ethylene glycol, propylene glycol, 1,4-butanediol, glycerol, trimethylolpropane, pentaerythritol, diglycerol, meso-erythritol, methylglucoside, glucose or sorbitol; a phenol such as bisphenol A; a condensed compound such as a phenol resin or a novolak resin; a compound having a molecular weight of from 200 to 600 per hydroxyl group, obtained by ring opening addition polymerization of propylene oxide to a polyhydric alcohol, a phenol or a condensed compound; or a compound having a molecular weight of from 200 to 600 per hydroxyl group, obtained by ring opening addition polymerization of propylene oxide to an amine (ethylenediamine, diethylenetriamine, piperazine, diaminodiphenylmethane or the like) or an alkanolamine (monoethanolamine, diethanolamine, triethanolamine or the like) may be mentioned. These initiators may be used in combination of two or more of them, and an active hydrogen compound such as sucrose having at least 7 active hydrogen atoms may be used in combination. Among these initiators, a polyhydric alcohol and a compound having a molecular weight of from 200 to 600 per hydroxyl group, obtained by ring opening addition polymerization of propylene oxide to a polyhydric alcohol by using an alkali metal compound catalyst or a phosphazenium catalyst, are more preferred. The latter compound is particularly preferred in view of its reactivity at the time of using the double metal cyanide complex catalyst.

The number of hydroxyl groups of the polyol (A) is preferably from 2 to 6, more preferably from 2.8 to 5.2. The number of hydroxyl groups of a polyoxyalkylene polyol in the present invention means an average of the number of active hydrogen atoms in the initiator. By setting the number of hydroxyl groups to at least 2, a flexible foam to be obtained will not be too softened, and a compression set is unlikely to be deteriorated. And by setting the number of hydroxyl groups to at most 6, a flexible foam to be obtained will not be too hardened, and mechanical properties such as elongation will be good.

The polyol (A) is a polyol having an oxyethylene group only at its terminal, which is obtained by subjecting propylene oxide to ring opening addition polymerization in the presence of a double metal cyanide complex catalyst, and further subjecting ethylene oxide to ring opening addition polymerization. The polyol (A) is a polyol comprising an oxypropylene block chain and an oxyethylene block chain at the terminal portion, and it contains no oxyethylene group at other than the terminal portion.

The content of the oxyethylene group at the terminal of the polyol (A) is from 10 to 20 mass % in the polyol (A) (100 mass %). And by setting the content of the oxyethylene group at the molecular terminal to at least 10 mass %, a flexible foam to be obtained will not readily be collapsed. Further, by setting the content of the oxyethylene group at the molecular terminal to at most 20 mass %, closed cells of a flexible foam will not be too many, and the flexible foam is unlikely to shrink.

The hydroxyl value of the polyol (A) is from 15 to 56 mgKOH/g, preferably from 20 to 35 mgKOH/g. By setting the hydroxyl value to at least 15 mgKOH/g, a flexible foam to be obtained will be sufficiently hardened and is unlikely to shrink. And by setting the hydroxyl value to at most 56 mgKOH/g, the elasticity of the flexible foam will be sufficient.

The content of the polyol (A) is from 20 to 65 mass % in the entire high molecular weight polyol compound (100 mass %) excluding a crosslinking agent. By setting the content of the polyol (A) to at most 65 mass %, closed cells in a flexible foam to be obtained will not be too many, and the flexible foam is unlikely to shrink. And by setting the content of the polyol (A) to at least 20 mass %, a low rebound resilience and a low transmissibility at resonance frequency as the effects of the present invention can be accomplished, and a good foam appearance can also be obtained, and further, production of the flexible foam without using a silicone foam stabilizer becomes possible.

(Polyol (B))

The high molecular weight polyol compound of the present invention may contain a polyol (B) other than the polyol (A) and other than the polyol (C) described hereinafter.

The polyol (B) is preferably a polyoxyalkylene polyol having a hydroxyl value of from 15 to 56 mgKOH/g and having a total oxyethylene group content of less than 50 mass %, obtained by subjecting an alkylene oxide to ring opening addition polymerization in the presence of a polymerization catalyst.

As the initiator, a compound having from 2 to 6 active hydrogen atoms in its molecule is preferred. For example, a polyhydric alcohol such as ethylene glycol, propylene glycol, 1,4-butanediol, glycerol, trimethylolpropane, pentaerythritol, diglycerol, meso-erythritol, methylglucoside, glucose or sorbitol; a phenol such as bisphenol A; a condensed compound such as a phenol resin or a novolak resin; a compound having a molecular weight of from 200 to 600 per hydroxyl group, obtained by ring opening addition polymerization of propylene oxide or ethylene oxide to a polyhydric alcohol, a phenol or a condensed compound; or a compound having a molecular weight of from 200 to 600 per hydroxyl group, obtained by ring opening addition polymerization of propylene oxide or ethylene oxide to an amine (ethylenediamine, diethylenetriamine, piperazine, diaminodiphenylmethane or the like) or an alkanolamine (monoethanolamine, diethanolamine, triethanolamine or the like), may be mentioned. These initiators may be used in combination of two or more of them, and an active hydrogen compound such as sucrose having at least 7 active hydrogen atoms may be used in combination. Among these initiators, a polyhydric alcohol and a compound having a molecular weight of from 200 to 600 per hydroxyl group, obtained by ring opening addition polymerization of propylene oxide to a polyhydric alcohol, are more preferred.

The number of hydroxyl groups of the polyol (B) is preferably from 2 to 6, more preferably from 2.8 to 5.2. The number of hydroxyl groups of the polyoxyalkylene polyol of the present invention means an average of the number of active hydrogen atoms in the initiator. By setting the number of hydroxyl groups to at least 2, a flexible foam to be obtained will not be too softened, and a compression set is unlikely to be deteriorated. And by setting the number of hydroxyl groups to at most 6, the flexible foam will not be too hardened, and mechanical properties such as elongation will be good.

As the alkylene oxide, propylene oxide, ethylene oxide or a combination thereof is preferred. As the polyol (B), a polyoxyalkylene polyol having an oxypropylene group content of from 50 to 100 mass % in the polyol (B) (100 mass %) is preferred, and a polyoxyalkylene polyol having an oxypropylene group content of from 50 to 99 mass % is particularly preferred.

As the polymerization catalyst for the polyol (B), an alkali metal compound catalyst such as a potassium compound (potassium hydroxide, potassium methoxide or the like) or a cesium compound (cesium metal, cesium hydroxide, cesium carbonate, cesium methoxide or the like); a double metal cyanide complex catalyst; or a phosphazenium compound may, for example, be mentioned. Among these polymerization catalysts, an alkali metal compound catalyst and a double metal cyanide complex catalyst are more preferred, and potassium hydroxide and potassium methoxide are particularly preferred in view of their economical advantage.

As the polyol (B), one having an oxyethylene group is preferred. The content of the total oxyethylene group of the polyol (B) is preferably less than 50 mass %, more preferably from 1 to 30 mass %, and particularly preferably from 5 to 25 mass %. Further, one having an oxyethylene group at the terminal is preferred, and the content of the oxyethylene group at the terminal is preferably from 1 to 20 mass % in the polyol (B) (100 mass %).

As the polyol (B), a polyol (B1) obtained in such a manner that an alkylene oxide such as propylene oxide is subjected to ring opening addition polymerization to an initiator by using a double metal cyanide complex catalyst, then a mixture of propylene oxide and ethylene oxide=40 to 99/60 to 1 (mass ratio) is subjected to ring opening addition polymerization to obtain a random polymer chain, and then ethylene oxide is subjected to ring opening addition polymerization to the molecular terminal by using an alkali metal compound catalyst or a phosphazenium catalyst, may be mentioned. The content of the oxyethylene group at the random portion of the polyol (B1) is preferably from 1 to 20 mass % in the polyol (B1) (100 mass %), and the content of the oxyethylene group at the terminal portion is preferably from 1 to 20 mass %.

Further, as the polyol (B), a polyol (B2) comprising an oxypropylene block chain and an oxyethylene block chain at the terminal, which is obtained in such a manner that propylene oxide is subjected to ring opening addition polymerization to an initiator by using an alkali metal compound catalyst or a phosphazenium catalyst, and ethylene oxide is subjected to ring opening addition polymerization to the terminal, may be mentioned. The content of the oxyethylene group at the terminal is preferably from 1 to 20 mass %.

The hydroxyl value of the polyol (B) is preferably from 15 to 56 mgKOH/g, more preferably from 15 to 45 mgKOH/g, and particularly preferably from 20 to 35 mgKOH/g. By setting the hydroxyl value to at least 15 mgKOH/g, an increase in viscosity of the high molecular weight polyol compound can be suppressed, thereby improving the moldability. And by setting the hydroxyl value to at most 45 mgKOH/g, the elongation of the flexible polyurethane foam to be obtained can be sufficiently secured.

(Cell Opener)

In the present invention, a so-called cell opener, which is a polyoxyalkylene polyol having a high oxyethylene group content, is preferably used. As the polyol (C), a polyoxyalkylene-oxyethylene polyol having an oxyethylene group content of from 50 to 100 mass % and having a hydroxyl value of from 15 to 56 mgKOH/g, which is obtained by ring opening addition polymerization of an alkylene oxide to an initiator in the presence of a polymerization catalyst, is preferred.

As the initiator and the polymerization catalyst, the same compounds used for the polyol (B) can be used.

The polyol (C) preferably has an oxyethylene group content of from 50 to 100 mass % in the polyol (C) (100 mass %), and one having an oxyethylene group content of from 60 to 90 mass % is preferred, and one having an oxyethylene group content of from 70 to 85 mass % is preferred. The polyol (C) may have the oxyethylene groups in its structure or at the terminal portion thereof. As the polyol (C), one having an oxypropylene group other than the oxyethylene group and a residue of the initiator is preferred. An average number of hydroxyl groups in the polyol (C) is preferably from 2 to 8, particularly preferably from 2 to 3. The hydroxyl value is particularly preferably from 20 to 50.

As the polyol (C), a polyol obtained by ring opening polymerization of a mixture of propylene oxide/ethylene oxide=5 to 40/60 to 95 (mass ratio) to a polyhydric alcohol as an initiator or a polyol having from 1 to 20 mass % of an oxyethylene group at the terminal, which is obtained by ring opening polymerization of ethylene oxide to the above polyol, may specifically be mentioned.

By using such a polyol (C), in a process for producing a flexible foam without using a foam stabilizer, a foam having better physical properties can be produced. The amount of the polyol (C) to be used is preferably from 0.01 to 10 parts by mass, particularly preferably from 0.05 to 10 parts by mass, in 100 parts by mass of the high molecular weight polyol compound (excluding crosslinking agent).

(Polymer-Dispersed Polyol)

The high molecular weight polyol compound of the present invention is preferably a polymer-dispersed polyol containing fine polymer particles dispersed in the high molecular weight polyol compound. The polymer-dispersed polyol is a dispersion in which fine polymer particles are stably dispersed in a polyoxyalkylene polyol matrix.

As the fine polymer particles, an addition polymerization type polymer such as a homopolymer or a copolymer of acrylonitrile, styrene, an alkyl methacrylate, an alkyl acrylate or another vinyl monomer; or a condensation polymerization type polymer such as a polyester, a polyurea, a polyurethane or a melamine resin may, for example, be mentioned.

The polymer-dispersed polyol is produced by a known method. Namely, it can be produced by polymerizing a vinyl monomer and the like in a high molecular weight polyol compound. Further, it can also be produced in such a manner that a vinyl monomer and the like are polymerized in a solution to obtain fine polymer particles, and then a high molecular weight polyol compound is mixed, and the solvent is distilled off.

The polymer-dispersed polyol having fine polymer particles dispersed in the high molecular weight polyol compound may also be produced in such a manner that a vinyl monomer and the like are polymerized by using a part of the high molecular weight polyol compound to be used in the present invention as a matrix so as to produce a polymer-dispersed polyol, followed by mixing. This method is preferred in view of easiness of productivity.

By the presence of the fine polymer particles, the hydroxyl value of the entire polymer-dispersed polyol decreases as compared with the hydroxyl value of the polyol as the matrix. The content of the fine polymer particles is usually at most 50 mass %, and preferably from 3 to 35 mass %, as the concentration based on the entire high molecular weight polyol compound. And even if the content of the fine polymer particles is too high, no inconvenience may arise other than its expense.

<Crosslinking Agent>

In the present invention, a crosslinking agent may be used. As the crosslinking agent, a compound having at least 2, preferably 2 to 8, active hydrogen-containing groups such as hydroxyl groups, primary amino groups or secondary amino groups, is preferred. The molecular weight of the crosslinking agent per active hydrogen-containing group is preferably less than 200, more preferably at most 150, and particularly preferably at most 100. And, two or more crosslinking agents may be used in combination.

The amount of the crosslinking agent to be used is preferably from 0.01 to 10 parts by mass, particularly preferably from 0.5 to 10 parts by mass, per 100 parts by mass of the entire high molecular weight polyol compound excluding the cell opener.

As the crosslinking agent, a compound such as ethylene glycol, propylene glycol, 1,4-butanediol, neopentyl glycol, 1,6-hexanediol, diethylene glycol, triethylene glycol, dipropylene glycol, glycerol, trimethylolpropane, pentaerythritol, diglycerol, dextrose, sorbitol, sucrose, monoethanolamine, diethanolamine, triethanolamine, bisphenol A, ethylenediamine, 3,5-diethyl-2,4(or 2,6)-diaminotoluene (DETDA), 2,4-toluenediamine, 2,6-toluenediamine, bis(3,5-dimethyl-4-aminophenyl)methane, 4,4'-diaminodiphenylmethane, ethylenediamine, m-xylylenediamine, 1,4-diaminohexane, 1,3-bis(aminomethyl)cyclohexane or isophoronediamine, and a compound obtainable by adding a relatively small amount of an alkylene oxide thereto may, for example, be mentioned.

<Isocyanate Compound>

As the isocyanate compound, an isocyanate compound containing from 50 to 100 mass % of tolylene diisocyanate in the isocyanate compound (100 mass %) is used.

The isocyanate compound preferably consists solely of tolylene diisocyanate or is a mixture of tolylene diisocyanate and a diphenylmethane diisocyanate type polyisocyanate.

As tolylene diisocyanate, 2,4-tolylene diisocyanate, 2,6-tolylene diisocyanate or a mixture thereof may be mentioned. Particularly, a mixture of 2,4-tolylene diisocyanate and 2,6-tolylene diisocyanate in a mass ratio of 80/20, is preferred. As the diphenylmethane diisocyanate type isocyanate, 4,4'-diphenylmethane diisocyanate (so-called pure MDI) or polymethylene is polyphenyl polyisocyanate (so-called polymeric MDI) may be mentioned, and the latter compound is preferred.

In the present invention, a mixture of tolylene diisocyanate and polymethylene polyphenyl polyisocyanate is particularly preferred. Especially, a mixture having a mass ratio (tolylene diisocyanate/polymethylene polyphenyl polyisocyanate) of from 100/0 to 50/50 is preferred, and a mixture having a mass ratio of 80/20 is particularly preferred. When the mass ratio of tolylene diisocyanate/polymethylene polyphenyl polyisocyanate is within the above range, the rebound resilience can be lowered by using substantially no silicone foam stabilizer, whereby a flexible foam having a low transmissibility at resonance frequency will be obtained.

The amount of the isocyanate compound to be used is preferably from 80 to 120, more preferably from 85 to 110, by the isocyanate index. The isocyanate index is a value represented by 100 times the equivalent amount of isocyanate groups to the total equivalent amount of all active hydrogen atoms in e.g. the high molecular weight polyol compound, the crosslinking agent and water.

<Blowing Agent>

As the blowing agent, water and/or an inert gas is preferably used. As the inert gas, air, nitrogen, carbon dioxide gas or the like may be mentioned.

The amount of the blowing agent to be used is not particularly limited, but in a case where water alone is used, the amount is preferably at most 10 parts by mass and particularly preferably from 0.1 to 8 parts by mass, per 100 parts by mass of the entire high molecular weight polyol compound excluding a crosslinking agent. And the inert gas as another blowing agent may be used in combination in a suitable amount on the basis of the requirement for e.g. expansion ratio. As the blowing agent, particularly preferably water alone is used.

<Urethane-Forming Catalyst>

As the urethane-forming catalyst, a conventionally known catalyst may be used, and there is no particular limitation thereto. As the urethane-forming catalyst, an aliphatic amine such as triethylene diamine, a DPG solution of bis-((2-dimethylamino)ethyl)ether or morpholine may be mentioned. Further, as the case requires, an organotin compound such as tin octanoate or dibutyltin dilaurate may be used.

The urethane-forming catalyst may be used alone or in combination of two or more of them.

The amount of the urethane-forming catalyst to be used is preferably at most 1.0 part by mass, particularly preferably from 0.05 to 1.0 part by mass, per 100 parts by mass of the entire high molecular weight polyol compound excluding the crosslinking agent.

<Foam Stabilizer>

In the present invention, substantially no silicone foam stabilizer is used. The wording "substantially no silicone foam stabilizer is used" means that a silicone foam stabilizer may be used in such an amount that no foam stabilizing effect is brought about, and the amount is usually from 0.0001 part by mass to 0 part by mass, per 100 parts by mass of the high molecular weight polyol compound.

A foam stabilizer containing no silicon compound, may be used, but in view of reduction of a volatile organic compound, it is preferred that no foam stabilizer is used at all. Namely, the flexible foam of the present invention is characterized by containing substantially no atoms other than carbon atoms, hydrogen atoms, nitrogen atoms and oxygen atoms. It means that in the present invention, these atoms are not contained as atoms forming a resin, but e.g. in a case where an organic metal compound is used as a catalyst, these atoms may be contained in the catalyst. Also in the present invention, "substantially no atoms other than these atoms are contained" means that a foam stabilizer or a surfactant, which is usually used, is not used.

In the present invention, the flexible foam can be produced by using substantially no foam stabilizer which used to be necessary to be used in an amount of from 0.8 to 5.0 parts by mass, per 100 parts by mass of the high molecular weight polyol compound in a conventional process for producing a flexible foam.

<Others>

In the process for producing a flexible foam of the present invention, other additives may be used. As the additives, a filler such as calcium carbonate or barium sulfate; an aging-preventive agent such as an emulsifier, an antioxidant or a ultraviolet absorber; a flame retardant, a plasticizer, a coloring agent, an antifungal agent, a cell opener, a dispersant and a discoloration-preventive agent may, for example, be mentioned. Further, in a case where another additive is added purposefully, atoms derived from such another additive other than carbon atoms, hydrogen atoms, nitrogen atoms and oxygen atoms may be contained in the flexible foam.

(Production of Flexible Polyurethane Foam)

As a method for forming the flexible foam, a method wherein a reactive mixture is directly injected into a mold by means of a low pressure foaming machine or a high pressure foaming machine (i.e. reaction injection molding) is preferred. The flexible foam can be produced by either a cold cure method or a hot cure method, but a cold cure method is preferred.

The production of the flexible foam is not particularly limited, but it can be carried out, for example, in such a manner that the temperatures of an isocyanate compound and a mixture of starting materials other than the isocyanate compound (hereinafter referred to as polyol system) are adjusted to from 15 to 40° C., then a predetermined amount of the isocyanate compound is added to the polyol system, followed by mixing and stirring for from 2 to 15 seconds by means of a high speed mixer, and then the mixture was immediately sealed in a container heated at from 30 to 80° C., followed by curing for from 4 to 20 minutes.

The resonance characteristic of the flexible foam can be evaluated by a resonance frequency. The resonance frequency of the flexible foam is preferably at most 3.6 Hz. The durability of the flexible foam can be evaluated by a compression set under humid condition and a hysteresis loss. The compression set under humid condition of the flexible foam is preferably at most 14%, more preferably at most 13%. Further, the hysteresis loss is preferably at most 22%, more preferably at most 21%. The flexible foam of the present invention preferably has a core rebound resilience of at least 40%.

The flexible foam produced by the present invention is used for a cushion, a seat cushion or the like, and particularly it is suitably used for a seat cushion for a vehicle such as an automobile.

EXAMPLES

Now, the present invention will be described in further detail with reference to Examples, however, the present invention is by no means restricted thereto. The numerical values in Examples and Comparative Examples represent parts by mass.

(Polyol Compound)

Polyol A: a polyether polyol obtained in such a manner that propylene oxide was subjected to ring opening addition polymerization to glycerol as an initiator by using a potassium hydroxide catalyst, followed by purification to obtain a polyoxypropylene triol having a molecular weight of 1,000, then propylene oxide was further subjected to ring opening addition polymerization by using a zinc hexacyanocobaltate-METB complex catalyst, and then ethylene oxide was subjected to ring opening addition polymerization by using a potassium hydroxide catalyst. The oxyethylene group content is 14 mass % in the polyol A (100 mass %), and the hydroxyl value is 24 mgKOH/g.

Polyol B1: a polyether triol obtained in such a manner that propylene oxide was subjected to ring opening addition polymerization to glycerol as an initiator by using a potassium hydroxide catalyst, followed by purification to obtain a polyoxypropylene trial having a molecular weight of 1,000, and propylene oxide was further subjected to ring opening addition polymerization by using a zinc hexacyanocobaltate-METB complex catalyst, then a mixture of propylene oxide and ethylene oxide (propylene oxide/ethylene oxide=89.3/10.7 (mass ratio)) was subjected to ring opening addition polymerization, and then ethylene oxide was subjected to ring opening addition polymerization by using a potassium hydroxide is catalyst. The polyether trial has a hydroxyl value of 24 mgKOH/g and has an oxyethylene group content at the terminal portion of 17 mass % in the polyol B1 (100 mass %) so as to have an oxyethylene group content at a random portion of 5 mass % in the polyol B1 (100 mass %).

Polyol B2: a polyether trial having a hydroxyl value of 34 mgKOH/g obtained in such a manner that propylene oxide was subjected to ring opening addition polymerization to glycerol as an initiator by using a potassium hydroxide catalyst, and then ethylene oxide was subjected to ring opening addition polymerization so as to have an oxyethylene group content of 14.5 mass % in the polyol (B2) (100 mass %).

Polyol B3: a polymer-dispersed polyol having a concentration of fine copolymer particles of 35 mass %, which is obtained by dispersing fine acrylonitrile-styrene copolymer particles (acrylonitrile/styrene=77.5/22.5 (mass ratio)) in the polyol B2 as a base polyol.

(Crosslinking Agent)

Crosslinking agent A: glycerol

Crosslinking agent B: diethanolamine

Crosslinking agent C: polyoxyalkylene polyol having a terminal oxyethylene group content of 28 mass % and having a hydroxyl value of 450, obtained by subjecting propylene oxide to ring opening addition polymerization to sorbitol as an initiator in the presence of a potassium hydroxide catalyst, and subjecting ethylene oxide to ring opening addition polymerization.

(Cell Opener)

Polyol C1: a polyoxyalkylene triol having a hydroxyl value of 48 mgKOH/g, obtained by randomly subjecting a mixture of propylene oxide and ethylene oxide (propylene oxide/ethylene oxide=20/80 (mass ratio)) to ring opening addition polymerization to glycerol as an initiator by using a potassium hydroxide catalyst.

Polyol C2: a polyoxyalkylene triol having an oxyethylene group content at the terminal portion of 7 mass % and having a hydroxyl value of 24 mgKOH/g, obtained by randomly subjecting a mixture of propylene oxide and ethylene oxide (propylene oxide/ethylene oxide=20/80 (mass ratio)) to ring opening addition polymerization to glycerol as an initiator by using a potassium hydroxide catalyst.

(Urethane-Forming Catalyst)

Catalyst A: a dipropylene glycol solution of triethylenediamine (TEDA L-33, trade name, manufactured by TOSOH CORPORATION).

Catalyst B: a dipropylene glycol solution of bis-((2-dimethylamino)ethyl)ether (Toyocat ET, trade name, manufactured by TOSOH CORPORATION).

(Foam stabilizer)

Foam stabilizer A: SZ-1325, trade name, manufactured by Dow Corning Toray Co., Ltd.

(Blowing Agent)

Water was used as a blowing agent.

(Isocyanate Compound)

A polyisocyanate compound (Coronate 1021 manufactured by Nippon Polyurethane Industry Co., Ltd.) having an isocyanate group content of 44.8 mass %, which is a mixture of a tolylene diisocyanate mixture of 2,4-tolylene diisocyanate and 2,6-tolylene diisocyanate (2,4-tolylene diisocyanate/2,6-tolylene diisocyanate=80/20 (mass ratio)) having an isocyanate group content of 48.2 mass % and a polymethylene polyphenyl polyisocyanate (tolylene diisocyanate mixture/polymethylene polyphenyl polyisocyanate=80/20 (mass ratio)), was used.

Examples 1 and 2 and Comparative Examples 1 to 3

A flexible foam was produced by using the above-mentioned starting materials. In Table 1, Examples 1 and 2 and Comparative Examples 1 to 3 are shown.

Specifically, the liquid temperatures of the polyol system and the isocyanate compound were separately adjusted to 25±1° C., and a predetermined amount of the isocyanate compound was added to the polyol system and mixed by means of a high speed mixer at 3,000 rpm for 5 seconds. The mixed solution thus obtained was immediately injected into a mold (400 mm in length and width, 100 mm in height) made of aluminum, which was heated at 60° C., and closed. After 6 minutes of curing, the obtained flexible foam was removed from the mold. Thereafter, crushing was sufficiently carried out, and the flexible foam was left to stand for at least 24 hours, and then various physical properties thereof were measured. The results are shown in Table 1.

The physical properties of the flexible foam were measured in accordance with the following standards. The overall density, the core density, the hardness, the rebound resilience, the air flow, the tear strength, the tensile strength, the elongation, the dry compression set and the compression set under humid condition: JIS K-6400 (1997 edition). For the measurement of the core density, a sample obtained by removing the skin portion from the center portion of the produced flexible foam and cutting such a flexible foam into a size of 100 mm in length and width and 50 mm in height, was used.

The hysteresis loss, the resonance frequency, the transmissibility at resonance frequency and the transmissibility at 6 Hz: JASO B407-87 (vibrational amplitude: ±2.5 mm, a pressure plate: Tekken type, (load: 490 N)).

With regard to an evaluation of the moldability, the foam molded without problems is represented by the symbol ○, and the foam having coarse cells on its surface (Comparative Example 1) or the foam with shrinkage at some part thereof (Comparative Example 2), is represented by Δ.

With regard to an evaluation of the crushing property, after the foam was removed from the mold, one which broke at the time of crushing is represented by the symbol ×, and one which underwent crushing without any problem is represented by the symbol ○. Further, in Comparative Example 3, at the time of producing the foam, in the process of growth of the foam, blowing and resin growth occurred unevenly, and cells in a foam which did not yet have a resin strength, were destroyed, whereby the entire foam could not retain its form and collapsed (in the Table, this is represented by the term "collapsed").

TABLE 1

|  | Examples | | | | Comparative Examples | | |
| --- | --- | --- | --- | --- | --- | --- | --- |
|  | 1 | 2 | 3 | 4 | 1 | 2 | 3 |
| Polyol A | 30 | 50 | 30 | 60 | 10 | 70 |  |
| Polyol B1 |  |  | 35 |  |  |  | 65 |
| Polyol B2 | 35 | 15 |  |  |  |  |  |
| Polyol B3 | 35 | 35 | 35 | 40 | 45 | 30 | 35 |
| Polyol C1 (Cell opener) | 2 | 2 | 2 |  | 2 | 2 | 2 |
| Polyol C2 (Cell opener) |  |  |  | 1 |  |  |  |
| Crosslinking agent A | 1.5 | 1.5 | 1.5 |  | 1.5 | 1.5 | 1.5 |
| Crosslinking agent B | 1 | 1 | 1 | 1 | 1 | 1 | 1 |
| Crosslinking agent C |  |  |  | 3 |  |  |  |
| Catalyst A | 0.45 | 0.45 | 0.45 | 0.6 | 0.45 | 0.45 | 0.45 |
| Catalyst B | 0.1 | 0.1 | 0.1 |  | 0.1 | 0.1 | 0.1 |
| Foam stabilizer | Absence | Absence | Absence | Absence | Absence | Absence | Absence |
| Blowing agent | 3 | 3 | 3 | 2.7 | 3 | 3 | 3 |
| Isocyanate index | 100 | 100 | 100 | 100 | 100 | 100 | 100 |
| Evaluation of moldability | ○ | ○ | ○ | ○ | Δ | Δ | Collapsed |
| Evaluation or crushing | ○ | ○ | ○ | ○ | ○ | X |  |
| Overall density (kg/m$^3$) | 58.5 | 58.2 | 58.5 | 53.6 | 58.4 | 58.3 | Unable to measure |
| Core density (kg/m$^3$) | 53.6 | 53.1 | 53.0 | 48.2 | 53.1 | 52.8 |  |
| Initial thickness (mm) | 93.4 | 93.1 | 94.5 | 96.7 | 93.5 | 92.4 |  |
| Hardness |  |  |  |  |  |  |  |
| 25% ILD (N/314 cm$^2$) | 282 | 284 | 277 | 213 | 300 | 253 | Unable to measure |
| 50% ILD (N/314 cm$^2$) | 497 | 510 | 477 | 370 | 510 | 415 |  |
| 65% ILD (N/314 cm$^2$) | 760 | 793 | 740 | 567 | 780 | 721 |  |
| Air flow (L/min) | 12.7 | 10.2 | 15.0 | 11.4 | 19.2 | 3.0 |  |
| Rebound resilience |  |  |  |  |  |  |  |
| With skin (%) | 60 | 56 | 65 | 64 | 30 | 68 |  |
| Core (%) | 64 | 62 | 64 | 68 | 33 | 44 |  |

TABLE 1-continued

|  | Examples | | | | Comparative Examples | | |
| --- | --- | --- | --- | --- | --- | --- | --- |
|  | 1 | 2 | 3 | 4 | 1 | 2 | 3 |
| Mechanical properties | | | | | | | |
| Tear strength (N/cm) | 5.7 | 6.2 | 6.0 | 6.6 | 7.8 | 5.2 | |
| Tensile strength (kPa) | 188 | 187 | 189 | 190 | 200 | 180 | |
| Elongation (%) | 103 | 99 | 100 | 105 | 40 | 100 | |
| Compression set | | | | | | | |
| Dry heat (%) | 3.2 | 3.6 | 2.9 | 2.9 | 5.0 | 5.9 | |
| Wet heat (%) | 12.0 | 12.1 | 10.1 | 10.5 | 15.5 | 14.7 | |
| Vibration characteristics | | | | | | | |
| Resonance frequency (Hz) | 3.5 | 3.6 | 3.5 | 3.3 | 5.0 | 4.1 | |
| Transmissibility at resonance frequency (A/A0) | 2.2 | 2.0 | 2.7 | 2.8 | 2.8 | 3.1 | |
| Transmissibility at 6 Hz | 0.8 | 0.8 | 0.8 | 0.58 | 1.2 | 1.1 | |
| Hysteresis loss (%) | 17.0 | 18.5 | 16.7 | 17.1 | 20.9 | | |
| Remarks | | | | | Occurrence of coarse cells | High ratio of closed cells | |

Evaluation of Flexible Foam

As is evident from the results, in a case where from 20 to 65 mass % of the polyol A is used as in Examples 1 to 4, the blowing was carried out without any problem by using substantially no foam stabilizer. Further, the rebound resilience of the flexible foam was suppressed, and its transmissibility at resonance frequency was lowered.

INDUSTRIAL APPLICABILITY

The flexible foam obtained by the process of the present invention is suitable for a seat cushion for a vehicle such as an automobile.

The entire disclosure of Japanese Patent Application No. 2004-334543 filed on Nov. 18, 2004 including specification, claims, drawings and summary are incorporated herein by reference in its entirety.

What is claimed is:

1. A process for producing a flexible polyurethane foam, which comprises reacting an isocyanate compound and a polyol compound in the presence of a urethane-forming catalyst and a blowing agent, wherein as the isocyanate compound, an isocyanate compound containing from 50 to 100 mass % of tolylene diisocyanate in the isocyanate compound (100 mass %) is used, as the polyol compound, a polyol compound containing from 20 to 65 mass % of the following polyoxypropylene-polyoxyethylene polyol (A), and the following polyol (B) and (C) in the polyol compound (100 mass %) is used, and substantially no silicone foam stabilizer is used:

(polyoxypropylene-polyoxyethylene polyol (A)):
 a polyoxypropylene-polyoxyethylene polyol (A) comprising (i) an oxypropylene block chain and (ii) an oxyethylene terminal block chain, which contains no oxyethylene group other than the oxyethylene terminal block chain, which is obtained by subjecting propylene oxide to ring opening addition polymerization to an initiator by using a double metal cyanide complex catalyst, and further subjecting ethylene oxide to ring opening addition polymerization by using an alkali metal compound catalyst or a phosphazenium catalyst, wherein the content of the oxyethylene group at the terminal is from 10 to 20 mass % in the polyoxypropylene-polyoxyethylene polyol (A) (100 mass %), and the hydroxyl value is from 15 to 56 mgKOH/g, polyol (B): a polyoxyalkylene polyol having a hydroxyl value of from 15 to 56 mgKOH/g and a total oxyethylene group content of less than 50 mass % and containing a polymer-dispersed polyol (B3) in a polyol compound, polyol (C): a polyoxyalkylene-oxyethylene polyol having a oxyethylene group content of from 50 to 100 mass % and a hydroxyl value of from 15 to 56 mgKOH/g.

2. A process for producing a flexible polyurethane foam, which comprises reacting an isocyanate compound and a polyol compound in the presence of a urethane-forming catalyst and a blowing agent, wherein as the isocyanate compound, an isocyanate compound containing from 50 to 100 mass % of tolylene diisocyanate in the isocyanate compound (100 mass %) is used, as the polyol compound, a polyol compound containing from 20 to 65 mass % of the following polyoxypropylene-polyoxyethylene polyol (A), and the following polyol (B) and (C) in the polyol compound (100 mass %) is used, and the flexible polyurethane foam to be produced contains substantially no atoms other than carbon atoms, hydrogen atoms, nitrogen atoms and oxygen atoms:

(polyoxypropylene-polyoxyethylene polyol (A)):
 a polyoxypropylene-polyoxyethylene polyol (A) comprising (i) an oxypropylene block chain and (ii) an oxyethylene terminal block chain, which contains no oxyethylene group other than the oxyethylene terminal block chain, which is obtained by subjecting propylene oxide to ring opening addition polymerization to an initiator by using a double metal cyanide complex catalyst, and further subjecting ethylene oxide to ring opening addition polymerization by using an alkali metal compound catalyst or a phosphazenium catalyst, wherein the content of the oxyethylene group at the terminal is from 10 to 20 mass % in the polyoxypropylene-polyoxyethylene polyol (A) (100 mass %), and the hydroxyl value is from 15 to 56 mgKOH/g, polyol (B): a polyoxyalkylene polyol having a hydroxyl value of from 15 to 56 mgKOH/g and a total oxyethylene group content of less than 50 mass % and containing a polymer-dispersed polyol (B3) in a polyol compound, polyol (C): a polyoxyalkylene-oxyethylene polyol having a oxyethylene group content of from 50 to 100 mass % and a hydroxyl value of from 15 to 56 mgKOH/g.

3. The process for producing a flexible polyurethane foam according to claim 1, wherein the polyol compound is a polyol compound containing fine polymer particles dispersed in the polyol compound.

4. The process for producing a flexible polyurethane foam according to claim 1, wherein the polyol (C) is used in an amount of from 0.01 to 10 parts by mass.

5. The process for producing a flexible polyurethane foam according to claim 1, wherein the hydroxyl value of the polyol compound is from 15 to 56 mgKOH/g.

6. The process for producing a flexible polyurethane foam according to claim 1, wherein only water is used as the blowing agent.

7. The process for producing a flexible polyurethane foam according to claim 1, wherein a rebound resilience of a core of the flexible polyurethane foam is at least 40%.

8. The process for producing a flexible polyurethane foam according to claim 1, wherein the flexible polyurethane foam is applicable to a cushion, a seat cushion or a seat for automobiles.

9. The process according to claim 1, wherein the blowing agent is at least one selected from the group consisting of water, air, nitrogen and carbon dioxide.

10. The process of claim 1 wherein no silicone foam stabilizer is present during the reacting.

11. The process of claim 1, wherein up to 0.0001 parts by mass of a silicone foam stabilizer is present during the reacting, wherein parts by mass is based on 100 parts by mass of the polyol compound.

12. The process of claim 1, wherein the ethylene oxide is subjected to ring opening addition polymerization in the presence of a phosphazenium catalyst.

13. The process according to claim 1, wherein the polyol (A) is present in an amount of 30-60 mass %, the polyol (B) is present in an amount of 40-70 mass % and the polyol (C) is present in an amount of 1-2 mass %; wherein the polyols (A), (B) and (C) are 100 mass % of the polyol compound.

14. The process according to claim 2, wherein the polyol (A) is present in an amount of 30-60 mass %, the polyol (B) is present in an amount of 40-70 mass % and the polyol (C) is present in an amount of 1-2 mass %; wherein the polyols (A), (B) and (C) are 100 mass % of the polyol compound.

15. The process according to claim 1, wherein the only polyols present during the reacting are the polyoxypropylene-polyoxyethylene polyol (A), the polyol (B) and the polyol (C).

16. The process according to claim 2, wherein the only polyols present during the reacting are the polyoxypropylene-polyoxyethylene polyol (A), the polyol (B) and the polyol (C).

17. The process according to claim 1, wherein the polyol compound consists of the polyoxypropylene-polyoxyethylene polyol (A), the polyol (B) and the polyol (C).

18. The process according to claim 2, wherein the polyol compound consists of the polyoxypropylene-polyoxyethylene polyol (A), the polyol (B) and the polyol (C).

* * * * *